Patented June 28, 1949

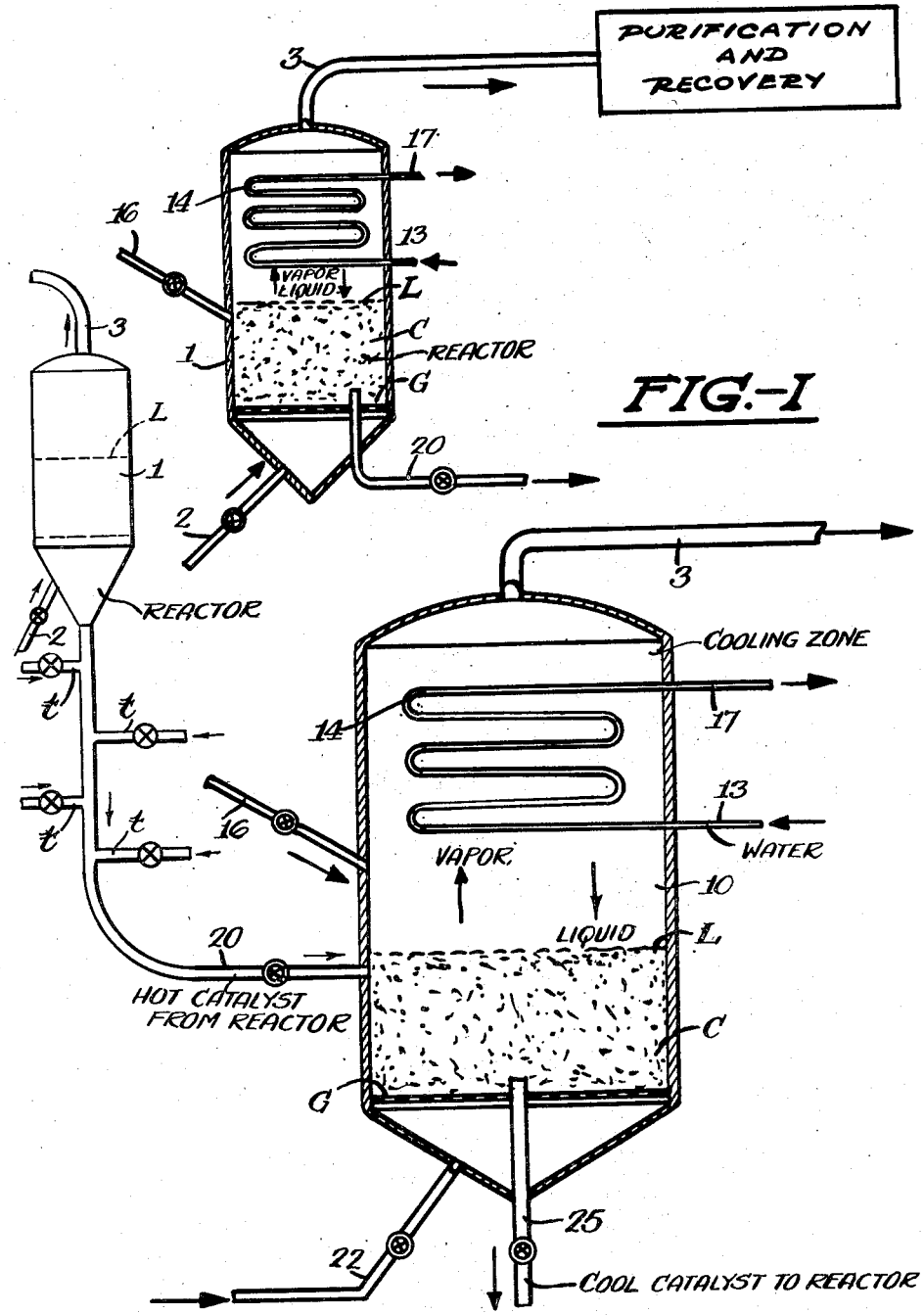

2,474,583

UNITED STATES PATENT OFFICE 2,474,583

TEMPERATURE CONTROL MEANS

Warren K. Lewis, Jr., Baton Rouge, La., assignor to Standard Oil Development Company, a corporation of Delaware Application January 19, 1946, Serial No. 642,397

6 Claims. (Cl. 260—449.6)

The novel features of my invention are fully disclosed in the following specification and claims considered in connection with the accompanying drawings forming a part of said specification.

Many commercial chemical processes are highly exothermic in character and present serious problems in maintaining uniform temperatures in the reaction zone, the avoidance of hot spots, and similar highly undesirable phenomena. I am fully aware that heretofore and prior to my invention others have proposed and used costly and cumbersome equipment in an attempt to maintain a reaction zone at some desired temperature. The problem of temperature control is aggravated where a large bed of catalyst is disposed in the reaction zone for many of these catalysts do not possess good thermal conductivity and there is little turbulence of the reacting gases or vapors within the reactor so, consequently, in the inner portions of the bed during an exothermic reaction there is grave danger that localized hot spots will occur, which may adversely affect the course of the reaction or in extreme cases may cause explosions.

I have now discovered means for abstracting heat from exothermic reactions and, in brief, my improvements are particularly adaptable to that type of catalytic process employing the so-called "fluid solid technique" all of which will be explained more fully hereinafter.

While the use of the fluid solid technique in catalytic reactions generally results in a more uniform temperature distribution than can be obtained with fixed beds of catalyst, in many cases the turbulence within the fluidized bed is insufficient to give the desired equalization of temperature throughout the reaction zone.

The main object of my invention, therefore, is to abstract from a powdered catalyst employed in a chemical reaction in the form of a dense suspension in the gasiform reactants in a more expeditious and effective manner than has been heretofore proposed or used.

Another object of my invention is to provide means for abstracting heat from a large scale commercial reactor employing a relatively small amount of heat transfer surface.

Another object of my invention is to provide means for effecting an efficient abstraction of heat from a fluidized catalyst employed in a highly exothermic reaction by the use of means which in no wise interfere with or even physically contact the dense suspension of fluidized catalyst.

Other and further objects of my invention will appear in the following more detailed description and claims.

In the accompanying drawings in Figure I, I have shown diagrammatically a fragment of a fluid catalyst hydrocarbon synthesis reactor provided with the cooling means embodying my present invention; and in Figure II, I have shown a modification of my invention in which a separate cooling drum is employed in connection with the hydrocarbon synthesis equipment shown in Figure I.

Similar reference characters refer to similar parts throughout the views.

While my invention is not limited in its application to abstracting heat from a hydrocarbon synthesis process, that type of operation will be used to illustrate a preferred modification of the said invention. First, it will be noted that heretofore, and prior to this invention, others have synthesized hydrocarbons from a mixture of carbon monoxide and hydrogen employing various catalysts for the reaction and that as a broad proposition this type of gasoline and gas oil manufacture has been used commercially, at least in foreign countries. Insofar as I am aware, however, the commercial hydrocarbon synthesis operations were performed employing a stationary or fixed bed of catalyst, and one of the serious problems in connection with this type of operation is that of temperature control. The same problem is present where the synthesis is performed employing the fluid catalyst technique and as I have previously indicated, my improvements go primarily to controlling the temperature in this latter type of operation. In general, the catalysts available for hydrocarbon synthesis are metals of the VIII group of the periodic system and, in particular, the catalysts used have been iron or cobalt. Any suitable catalyst may be used, according to my process, but the present indications are that some form of iron catalyst is superior, at least insofar as gasoline manufacture is concerned, since the product possesses higher anti-detonation quality; and I will assume in the following detailed description that the catalyst employed is powdered iron having an average particle size of from 50 to 100 microns.

Referring in detail to Figures I and II, C represents a body of powdered iron catalyst suspension having a density of from about 50 to 150 pounds per cubic foot and formed in reactor I (or cooling drum 10 of Figure II) by causing a gasiform material to flow upwardly through the mass of catalyst at a superficial velocity of from 0.25 to 3 feet, or thereabouts, per second. The method of causing fluidization of a powdered catalyst was known prior to this invention and need not be explained further herein. Referring in detail to Figure I, a mixture of carbon monoxide and hydrogen properly proportioned, say, containing about 1 mol of hydrogen per mol of carbon monoxide enters the system through line 2 and is discharged into the bottom of reactor 1 and thereafter passes upwardly through a grid G into the main body of the catalyst. Depending on the amount, that is, the actual number of pounds of catalyst in the reactor, the dense suspension will have an upper dense phase level at some point L, above which there will be a more dilute phase, in which the concentration of catalyst drops sharply from point L to the exit line 3, from which the product gases are withdrawn from the reactor. The conditions of temperature and pressure for the hydrocarbon synthesis are known per se and do not form a part of my present invention. It will be sufficient, therefore, to say that the mixture of carbon monoxide and hydrogen is contacted with the catalyst at synthesis conditions of temperature and pressure and for a sufficient period of time to effect the desired conversion, whereupon the product gases are withdrawn through line 3, as previously indicated, and delivered to product recovery and purification equipment according to known procedure, in itself not forming a part of my present invention.

My invention is contained in the concept of controlling the temperature prevailing in the reactor between G and L. Using an iron catalyst, the temperature in the dense phase should be maintained at around 550–650° F. Since the reaction is highly exothermic it is necessary to resort to cooling to maintain the temperature in the reaction zone within the aforementioned range. Heretofore it has been proposed to insert tubes containing a circulating fluid within the dense catalyst phase. This method of cooling has not proved to be satisfactory for various reasons, including among others, the erosion of the tube walls by the scouring action of the moving particles of catalyst, the physical hindrance and interference of the tube bundles with the fluidizing of the catalyst and numerous other objections. According to my invention, I dispose cooling coils in the upper dilute phase of the suspension, and in a preferred modification inject water from some extraneous scource through line 13 in conjunction with coils 14 disposed in said dilute suspension. Condensible vapors in the product gases rising above the dense suspension of catalyst contact the cooling tubes 14 causing condensation of the vaporized liquid which thereupon returns by gravity to the dense phase of catalyst. The condensed liquid on contacting the hot catalyst in the dense phase is again vaporized. This vaporization of the liquid abstracts heat from the dense phase of the catalyst and the heat of vaporization is subsequently removed from the vaporized liquid by contact with cooling tubes 14, thus effecting an abstraction of heat from the catalyst.

In some chemical reactions there is a sufficient concentration of condensible vapors in the product so that adequate condensation on the cooling tubes 14 is effected to give the desired degree of cooling. However, in the hydrocarbon synthesis reaction the condensible vapors are mixed with such a large volume of non-condensible gas that insufficient condensation may occur to effect the desired abstraction of heat from the dense phase of catalyst. In this and similar cases I inject a liquid through line 16 in reactor I at some point below the cooling tubes 14. The liquid injected through line 16 is one that will vaporize under the conditions of temperature and pressure prevailing in the dense suspension and will also condense on contact with the cooling tubes 14. Furthermore, the liquid injected must be one which will in no wise impair or inactivate the catalyst. I have found that in the hydrocarbon synthesis operation a fraction of the liquid product from the product recovery system may be used to good advantage, recycle of the said product being effected from the product recovery system to the reactor 1, the amount of recycle being regulated to give a sufficient partial pressure of the condensible liquid in the reactor to effect reflux between the cooling tubes and the dense phase of catalyst. However, liquids other than products of the reaction may be used provided they meet the requirements hereinbefore set forth. With respect to the liquid injected through line 13, the same is preferably water which is at least partially converted to steam in coil 14, which steam may be recovered through line 17. The steam in line 17 will be high pressure steam, the actual pressure of the steam being, of course, determined by the temperature thereof, but in the ordinary operation of my process the steam in line 17 may be at a temperature of 350° F. and a pressure of 120 lbs./sq. in. gauge.

In Figure II I have shown a modification of my invention where instead of placing the cooling tubes in the dilute phase portion of the reactor, I withdraw catalyst from the reactor 1, as via drawoff pipe 20 carrying fluidizing gas taps $t$ and discharge it into a separate cooling drum 10. In this modification the catalyst is discharged from line 20 into the cooling drum 10 and simultaneously a fluidizing gas such as methane, ethane, or any inert gas is introduced into the bottom of the drum via line 22 and thereafter forced upwardly through a grid G into a dense phase, the superficial velocity of the gas being regulated as in the case of reactor 1 within limits so as to form the dense suspension referred to; that is to say, the gas velocity is from 0.25 to 3 or more feet per second, causing the formation of a suspension having a density of 50 to 150 pounds per cubic foot where the catalyst is metallic iron. A liquid such as a hydrocarbon oil or Dowtherm which I understand to be a mixture of diphenyl and diphenyl oxide is injected into the cooling drum through line 16 and the hot catalyst causes vaporization of the said liquid, which vapors ascend and contact the cooling coil 14, as in the case of Figure I, causing condensation and reflux of the liquid to the dense phase, thus abstracting heat from the catalyst in the manner indicated. The inert gases are withdrawn from the cooling tank through line 3 and rejected from the system, or, of course, they may be collected and reused together with uncondensed vapors of the cooling liquid. The cooled catalyst is withdrawn from the tank 10 through line 25 and returned to reactor 1 for further use in the process.

In order to explain my invention more fully I set forth below a comparison showing the advantages to be gained by the application of my invention in the synthesis of hydrocarbons with carbon monoxide and hydrogen. In a hydrocarbon synthesis plant producing 10,000 barrels per day of liquid hydrocarbon product, the heat to be abstracted from the reaction zone amounts to approximately 800,000,000 B. t. u. per hour. Normal octane may be used as the vaporizable liquid to be refluxed and at a pressure of 205 pounds per square inch gauge in the reactor, the boiling point of the normal octane will be 500° F. The normal octane used may be either that obtained as product or that from some extraneous source. The pressure within the cooling tubes 14 is regulated to maintain the boiling water and steam at a temperature of 350° F. giving a temperature gradient of 150° F. between the condensing normal octane on the outside of the tubes and the boiling water inside of the tubes. Under these conditions a heat transfer coefficient of about 200 B. t. u. per hour per square foot per degree Fahrenheit is obtained. Consequently, the necessary heat transfer surface required to abstract the heat from the reaction zone is equal to $$\frac{800,000,000}{200\times(500-350)}=26,700 \text{ sq. ft.}$$

In case the heat is removed by boiler tubes disposed within the dense phase of catalyst, it has been found that a temperature gradient of only about 100° F. between the catalyst on the outside of the tubes and the boiling liquid inside of the tubes can be tolerated in order to prevent large temperature gradients within the catalyst bed. Furthermore, it has been found that the overall heat transfer coefficient obtained under such conditions is only about 35 B. t. u. per hour per square foot per degree Fahrenheit. Consequently, the heat transfer area required for removing the heat from the reaction zone in this case is equal to $$\frac{800,000,000}{35\times100}=228,000 \text{ sq. ft.}$$

It is evident from these figures that approximately eight and one-half times the heat transfer area is required by conventional means of abstracting the heat of reaction as are required according to my present invention.

As I have previously indicated, my improvements are by no means limited to controlling temperature in the hydrocarbon synthesis type operation, but are applicable to any of a large number of exothermic chemical processes, such as the non-selective polymerization of olefinic hydrocarbons, employing a fluidized bed of, say, phosphoric acid on kieselguhr, the oxidation of ammonia to form nitric acid, the oxidation of $SO_2$, the oxidation of naphthalene to phthalic anhydride, the oxidation of metals, such as iron, and various other oxidations, chlorinations, hydrogenations, and the like. In particular, my improvements are important in controlling the temperature of olefinic polymerization for in the past where this type of process has been carried out in stationary beds, heat and temperature control have presented a very serious problem.

To recapitulate briefly, the present invention is intended to provide a cheap means of cooling a fluid catalyst, a matter of importance in such processes as the synthesis of hydrocarbons from carbon monoxide and hydrogen in which large quantities of heat are liberated. In one modification of my invention which I have described, the catalyst to be cooled is passed through a drum, either vertical or horizontal, in such wise as to maintain a dense bed of catalyst in the drum. In the top part of the drum above the dense bed are situated boiler tubes in which steam is to be generated. There is injected into the drum a suitable liquid which may well be a reactor product cut of proper boiling range. The liquid, on falling into the dense bed, is immediately vaporized by the hot catalyst, which is thereby cooled. The vapors rise to the top part of the drum where they are condensed on the boiler tubes and the cycle repeated indefinitely. While the catalyst may pass through the drum in either upflow or downflow fashion, it is felt that downflow (as shown in the sketch) is better because this minimizes the chance of any of the heat transfer liquid leaving the drum with the catalyst.

My present invention has numerous advantages over cooling a fluidized bed of catalyst by conventional means which have been practiced in the past. For example, with respect to the use of boiler tubes situated within the reactor, my invention has the advantages that much higher overall heat transfer coefficients are obtained and much higher temperature differentials can be tolerated between the catalyst and the boiling liquid within the cooling tubes. Furthermore, high reactor temperatures will not necessitate the use of excessively high steam pressures within the boiler tubes. Also there is no interference with circulation or fluidization of the catalyst within the reaction zone because of heat transfer equipment disposed within the fluidized bed of catalyst. With regard to cooling by circulation of the catalyst outside of the reactor in contact with boiler tubes, the present invention has the advantages that higher heat transfer coefficients are obtained and there is no pressure drop resulting from circulation of the catalyst through conventional heat exchange equipment.

Numerous modifications of my invention may be made by those who are familiar with this art without departing from the spirit thereof.

What I claim is:

1. The method of abstracting heat from a system comprising a lower dense phase suspension of powdered material in a gasiform substance, and immediately above and contiguous therewith a dilute phase suspension of said powdered material in said gasiform substance, which comprises contacting said dense phase suspension with a liquid vaporizable at the temperature and pressure prevailing within the said dense phase suspension, providing a confined stream of a flowing coolant in the said dilute phase suspension, permitting vapors formed in the dense phase suspension to flow in heat exchange relationship with the said flowing confined stream of cooling fluid whereby the vaporized liquid is condensed at least in part, permitting the condensate to reflux by gravity to said dense phase suspension, where it is again vaporized and heat is thereby abstracted from said dense phase suspension.

2. The method set forth in claim 1 in which the said vaporizable liquid is added to the powdered material in a hydrocarbon synthesis reaction zone.

3. The method set forth in claim 1 in which the vaporizable liquid is a hydrocarbon boiling substantially within the light gas oil range.

4. The method of abstracting heat from an exothermic reaction carried out in a reaction zone in which a powdered catalyst material is present in a lower dense phase suspension and in an upper dilute phase suspension contiguous with the former which comprises providing a flowing confined stream of a coolant in the upper dilute phase, permitting vaporous products issuing from the dense suspension to flow in heat exchange relationship with said coolant under conditions of temperature and pressure such that at least a portion of said vapors are condensed, permitting said condensate to return by gravity to said dense phase, where it contacts said last-named phase under conditions of temperature and pressure permitting vaporization of said condensate whereby heat is abstracted from said dense phase.

5. The method set forth in claim 4 in which the powdered material is a hydrocarbon synthesis catalyst suspended in a gasiform material comprising hydrogen and carbon monoxide.

6. The method of abstracting heat from an exothermic conversion system comprising withdrawing a hot stream of finely divided catalyst particles from a hot dense turbulent bed of catalyst maintained in a conversion zone, introducing the withdrawn stream into a cooling zone, passing an inert gas upwardly through the cooling zone at a rate appropriate to maintain the particles as a dense turbulent bed in the lower portion of the cooling zone and as a dilute suspension above and contiguous with said dense bed, also introducing into the cooling zone a coolant which is vaporizable at the temperature and pressure prevailing in the said dense bed, causing a relatively cool confined stream of liquid to flow in the said dilute suspension in indirect heat exchange with the vaporized coolant whereby a substantial portion of the latter is condensed, refluxing the condensed coolant to the dense turbulent bed where it is again completely vaporized and heat is thereby abstracted from the catalyst in the dense bed and returning a stream of cooled catalyst from the dense bed to the conversion zone.

WARREN K. LEWIS, Jr.

REFERENCES CITED

The following references are of record in the file of this patent:

UNITED STATES PATENTS

| Number | Name | Date |
| --- | --- | --- |
| 2,146,667 | Atwell | Feb. 7, 1939 |
| 2,161,974 | Peck | June 13, 1939 |
| 2,331,343 | Phillips | Oct. 12, 1943 |
| 2,354,355 | Abrams | July 25, 1944 |
| 2,393,909 | Johnson | Jan. 29, 1946 |
| 2,394,710 | McAfee | Feb. 12, 1946 |
| 2,402,875 | Cornell | June 25, 1946 |
| 2,406,851 | Redcay | Sept. 3, 1946 |
| 2,411,760 | Sensel | Nov. 26, 1946 |

FOREIGN PATENTS

| Number | Country | Date |
| --- | --- | --- |
| 505,121 | Great Britain | May 5, 1939 |